Patented July 13, 1943

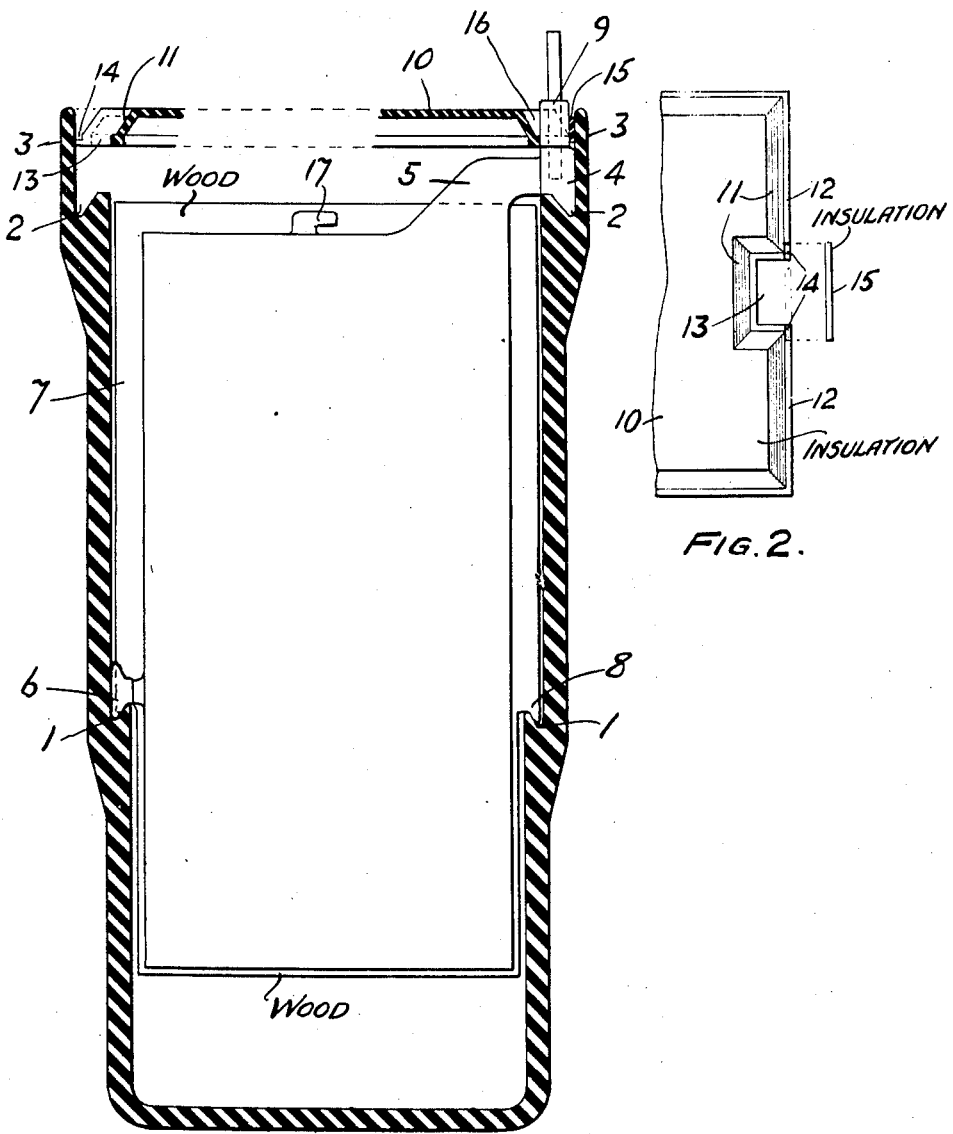

2,324,185

UNITED STATES PATENT OFFICE

2,324,185

ELECTRIC STORAGE BATTERY

Cornelius Ambruster, Roslyn, Pa., assignor to The Electric Storage Battery Company, Philadelphia, Pa., a corporation of New Jersey Application November 25, 1940, Serial No. 367,026

6 Claims. (Cl. 136—80)

Objects of the present invention are: to provide a cell in the large-size class that can be assembled at the factory and shipped as a unit assembled and sealed; to simplify the operation of assembling such a cell; to provide an assembly that will withstand the shocks incident to shipment; to provide for inspection, after installation, by removal of cover without disconnecting the cell from the circuit; and to provide for removal and replacement of individual plates and separators, after installation, without disturbing the cell in the circuit.

Other objects of the invention will appear from the following description at the end of which the invention will be claimed.

Generally stated, the invention comprises the improvements to be presently described and finally claimed.

In the following description, reference will be made to the accompanying drawing forming part hereof and in which:

Fig. 1 is a vertical sectional view of a storage battery embodying features of the invention, and Fig. 2 is a top or plan view of a portion of the cover detached and showing features of the invention.

Referring to the drawing, the jar is of three dimensions in respect to the distance between its side walls. At the lower portion the side walls are nearer together than they are at the intermediate portion, and at the top the side walls are further apart than they are at the intermediate portion. At the top of the side walls of the lower portion there is a shelf 1 with a V-shaped groove. At the top of the intermediate portion there is a shelf 2 with a V-shaped groove, and above the V-shaped groove 2 there is what may be designated a rim 3. Upon each of the shelves 2 is arranged a bus bar 4 provided with a V-shaped foot portion and disposed with its inner face flush with the inner face of the side walls of the jar. There are, of course, in the element a group of positive plates and a group of negative plates. Since the plates of each group are substantially alike so far as the present invention is concerned, one group will be described. The lugs 5 of the plates of one group are secured to the bus bar 4, and each plate is provided with a hook 6 which engages the V-groove in the shelf 1 of the side wall opposite to the side wall which supports the bus bar 4. The hook 6 may well be covered with a rubber or like hood to guard against the effect of deposit. Inasmuch as the hooks of the group of plates of one polarity are at one side of the jar, and the groups of hooks of the plates of the other polarity are at the other side of the jar, short circuits are guarded against. The separator 7 is wider at the top than it is at the bottom and is supported from the side walls of the jar so that it may extend beyond the rim of the plates. In the present instance, the separator is shown as provided on each side with a hook 8 which engages the shelves 1. The terminal post 9 is either made integral with or, as shown, inserted in the bus bar and the outer face of the terminal post is shown as inset from the outer face of the bus bar and from the inner face of the rim 3. The cover 10, at its margin, is outwardly inclined as at 11 and outwardly flanged as at 12. The flange and the inclined portions are horizontally notched or recessed as at 13 for the accommodation of the terminal post and vertically notched as at 14 for the reception of a fillet 15, which lies between the terminal post and inside of the rim 3. Space is provided as at 16 for the reception of sealing compound. The fillet 15 is made of rubber or some other suitable acid resisting material.

It is an advantage of the described construction that, while the jars and elements are assembled, for example at the factory, and shipped, the elements are not displaced in respect to the jars during transit for the reason that they are supported in the drawing at the right by their lugs on the shelf 4 and at the left by the hooks 6. Any tendency of the plates to swing about the support 4, like a pendulum, is opposed and prevented at the support 6 because the moment of the weight below the support 4 balances the moment above the support 1 and this action is effective in either direction. It is desirable that the support 1 be located at about two-thirds of the height of the plate from its top since this location is about opposite the center of percussion of the element in a horizontal direction, about 2.

The fingers 17 shown at the top of the plates all point in one direction in the assembled element and are of use in final assembly of the element since they permit of the assembly of the plates in a jig during the welding of the bus bar to the lugs, and then by means of a suitable clamp embracing the fingers 17, the complete element can be held in alignment while it is removed from the jig and introduced into the jar.

Since the inner face of the bus bar 4 is flush with the inner face of the side wall of the jar, individual plates and separators can be removed and replaced as may be desired. Furthermore, if the sealing compound be removed, the cover can be tilted and removed from the cell without disturbing the circuit connections of the terminal posts.

It will be obvious to those skilled in the art that modifications may be made in details of construction and in matters of mere form without departing from the spirit of the invention.

I claim:

1. A storage battery comprising, in combination, a jar having its side walls progressively spaced further apart in passing from the bottom section to the intermediate section and to the top rim, the top of the walls of the bottom section provided with a shelf having a V-groove, the walls at the top of the intermediate section also provided with a shelf having a V-groove, a bus bar having a V-foot seated in the groove of the top shelf and having its inner face flush with the face of the wall of the intermediate section, a group of plates of the same polarity having lugs secured to the bus bar and provided with hooks engaging the lowermost shelf on the side of the jar opposite the bus bar, a terminal post on the bus bar inset from the inner surface of the rim of the jar, a cover inclined at its margin and provided with a flange notched for the accommodation of the terminal post and also notched vertically, a fillet arranged between the outer face of the terminal post and the inner face of the rim of the jar and mounted in said vertical notches, and a separator extending beyond the edges of the plate and wider at its upper portion than it is at its lower portion, providing shoulders supported on the lower shelves of the opposite side walls.

2. In a storage battery the combination of a jar having an integral shelf located near its top rim, a bus bar seated on said shelf and provided with a terminal post spaced from the inner surface of said top rim of said jar, a covering having a downwardly inclined margin and an outwardly extending flange, said margin and flange being recessed for the accommodation of said terminal post, notches in said outwardly extending flange adjacent the open side of said recess, and an acid resisting fillet arranged in said notches and interposed between said terminal post and said inner face of the top rim of said jar.

3. In a storage battery, the combination of, a jar, a conducting bus bar inset in one side wall of the jar and flush with the face thereof, a plate attached to and suspended from the bus bar, an integral shelf on the opposite side wall of the jar below its center of height, and a hook on the plate engaging the last-mentioned shelf.

4. In a storage battery the combination of a jar having on each side wall an upper and lower shelf, a group of positive plates, each plate having a projection resting on the lower shelf of one of said side walls, a group of negative plates, each plate having a projection resting on the lower shelf of the opposite side wall, a bus bar seated on the upper shelf of said one side wall and connected to said group of negative plates, a bus bar seated on the upper shelf of said opposite side wall and connected to said group of positive plates, and projections on the top edge of all of said plates having hook portions disposed in the same direction, said hook portions being adapted to facilitate the assembly of said plates and bus bars into groups outside of said jar and the mounting of said groups in said jar on said upper and lower shelves.

5. The combination in a storage battery comprising a jar having its side walls progressively spaced apart to provide a bottom section, an intermediate section, and a top rim section, a lower shelf formed in the substance of the jar side wall and located between said bottom and intermediate sections, an upper shelf formed in the substance of the jar side wall and located between said intermediate and top rim sections, grooves in each of said shelves, a bus bar having a foot portion seated in the groove of said upper shelf, a group of plates connected at their upper edge to said bus bar, and a projection on the side edge of each plate of said group opposite the side edge nearest the point of connection of said plates to said bus bar, said projection lying intermediate the top and bottom edge of said plates and being seated in the groove in said lower shelf.

6. The combination in a storage battery comprising a jar having its side walls progressively spaced apart to provide a bottom section, an intermediate section, and a top rim section, a lower shelf formed between said bottom and intermediate sections, an upper shelf formed between said intermediate and top rim sections, grooves in each of said shelves, a bus bar having a foot portion seated in the groove of said upper shelf and having its inner face flush with the face of the wall forming said intermediate section, a group of plates connected at their upper edge to said bus bar, a projection on the side edge of each plate of said group opposite the side edge nearest the point of connection of said plates to said bus bar, said projection lying intermediate the top and bottom edge of said plates and being seated in the groove in said lower shelf, and separators extending beyond the edges of the plates of said group and wider at their upper portions than at their lower portions, providing shoulders supported on said lower shelf formed in said side walls.

CORNELIUS AMBRUSTER.